United States Patent
Mihara et al.

[19]

[11] Patent Number: 5,965,285
[45] Date of Patent: *Oct. 12, 1999

[54] MAGNETO-OPTICAL RECORDING MEDIUM AND REPRODUCING METHOD FOR THE SAME

[75] Inventors: Motonobu Mihara; Ken Tamanoi, both of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/557,604

[22] Filed: Nov. 14, 1995

[30] Foreign Application Priority Data

Mar. 27, 1995 [JP] Japan .................................. 7-068171

[51] Int. Cl.$^6$ ...................................................... G11B 5/66
[52] U.S. Cl. .......................... 428/694 ML; 428/694 SC; 428/694 MM; 428/694 EC; 428/694 IS; 428/900; 369/13; 369/272; 369/283; 369/288
[58] Field of Search ...................... 428/694 ML, 694 SC, 428/694 MM, 694 EC, 694 IS, 900; 369/13, 272, 283, 288

[56] References Cited

U.S. PATENT DOCUMENTS

| | | | |
|---|---|---|---|
| 4,621,030 | 11/1986 | Uesaka et al. | 428/607 |
| 4,992,338 | 2/1991 | Hatwar et al. | 428/694 MM |
| 5,142,513 | 8/1992 | Takehara et al. | 369/13 |
| 5,420,833 | 5/1995 | Tanaka et al. | 369/13 |
| 5,428,585 | 6/1995 | Hirokane | 369/13 |
| 5,450,382 | 9/1995 | Shiratori et al. | 369/13 |
| 5,463,578 | 10/1995 | Gambino et al. | 365/122 |
| 5,558,945 | 9/1996 | Miyazaki et al. | 428/611 |
| 5,580,667 | 12/1996 | Lal et al. | 428/610 |
| 5,666,346 | 9/1997 | Mishimura | 369/275.2 |

FOREIGN PATENT DOCUMENTS

| | | |
|---|---|---|
| 62-184644 | 8/1987 | Japan . |
| 393056 | 4/1991 | Japan . |
| 3156751 | 7/1991 | Japan . |
| 3156752 | 7/1991 | Japan . |
| 3230339 | 10/1991 | Japan . |
| 4192135 | 7/1992 | Japan . |
| 56588 | 1/1993 | Japan . |
| 589536 | 4/1993 | Japan . |

*Primary Examiner*—Leszek Kiliman
*Attorney, Agent, or Firm*—Greer, Burns & Crain, Ltd.

[57] ABSTRACT

A magneto-optical recording medium having first magnetic layer and second magnetic layers respectively serving as recording and reproduction layers. When an exchange-coupled force is induced between the layers, the reproducing layer takes on an identical magnetization direction as the recording layers permitting the data stored in the recording layer to be reproduced via the reproducing layer. An intermediate layer formed between the first and second magnetic layers is formed of an antiferromagnetic and has a Néel temperature higher than the temperature at which the reproducing layer mirrors the magnetization direction of the recording layer. A medium in accordance with the present invention may also include a third magnetic layer for controlling the recording and erasing of data from the first layer, and a fourth magnetic layer for holding a magnetization direction during a data erasing operation.

8 Claims, 15 Drawing Sheets

F I G. 8
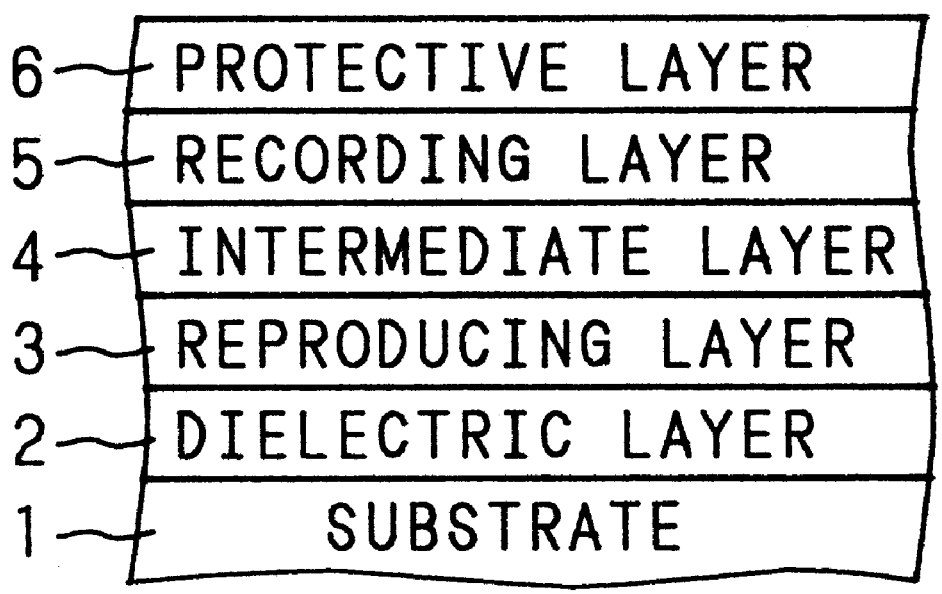

MAGNETO-OPTICAL RECORDING MEDIUM AND REPRODUCING METHOD FOR THE SAME

BACKGROUND OF THE INVENTION

1. Field of the Invention

The present invention relates to a magneto-optical recording medium for magnetically recording, reproducing and erasing information through irradiation of a laser beam to a magnetic layer therein, and also to a reproducing method for the magneto-optical recording medium.

2. Description of Related Art

Recently, a magneto-optical recording medium with a packing density of approximately 100 times as high as that of a flexible disk has been commercially available. Furthermore, Japanese Patent Application Laid-Open No. 62-184644 (1987) discloses a magneto-optical memory medium basically constituted of an exchange-coupled double-layer film comprising a recording layer made of an antiferromagnetic material and a reading layer made of a ferromagnetic material. In this magneto-optical recording medium, recorded data is very stable against an external bias magnetic field and can be overwritten with ease.

A storage capacity of a 3.5-inch magneto-optical disk is, however, 128 megabyte (MB) or 230 MB, which cannot be said to be sufficient. A much larger capacity is required to deal with dynamic images and the like in multimedia. As a method of increasing the capacity of a magneto-optical disk, a mark length is decreased. The decrease of the mark length has, however, a limitation because there is a limitation in the detection of a laser beam used for reproducing data.

As a method of coping with the limitation in the detection of a reproducing laser beam, a recording method using a signal with a short mark length, which is designated as a magnetically induced super resolution (MSR) method, is proposed. The MSR method utilizes an exchange-coupled force or a magnetostatic-coupled force acting between magnetic layers. FIG. 1 shows the configuration of a general magneto-optical disk device using the MSR method. A magneto-optical disk 30 consists of a magnetic triple-layer 31 formed on a transparent substrate 11, and is rotated by a spindle motor 32. An electromagnet 34 is driven by an electromagnet driving circuit 36 so as to apply a bias magnetic field in a predetermined direction to the magneto-optical disk 30. A direction of the bias magnetic field is switched to be upward or downward depending upon a direction of a current flowing through the electromagnet 34.

A data signal to be written in the magneto-optical disk 30 is generated by a signal generating circuit 38 and supplied to a laser driving circuit 33. In response to the data signal, the laser driving circuit 33 modulates and drives a laser diode 35 in accordance with the data signal. A laser beam generated by the laser diode 35 is collimated by a collimator lens 37, passes through a beam splitter 39, and is focused on the magnetic layer 31 of the magneto-optical disk 30 by an object lens 40. The data signal is thus written in the magneto-optical disk 30 by irradiating the laser beam generated by the laser diode 35 to the magnetic layer 31 on the magneto-optical disk 30 while applying a bias magnetic field in the predetermined direction by the electromagnet 34.

When information (a data signal) recorded in the magneto-optical disk 30 is reproduced, a reproducing laser beam having a smaller intensity than that of a recording laser beam is shed on the magneto-optical disk 30 by driving the laser diode 35 while applying a bias magnetic field in a predetermined direction by the electromagnet 34. Reflected light beam from the magneto-optical disk 30 is collimated by the object lens 40, is reflected by the beam splitter 39, passes through an analyzer 41 and is converged by a lens 42 on an optical sensor 43. The information recorded in the magneto-optical disk 30 is converted into an electric signal by the optical sensor 43 to be reproduced.

FIG. 2 is a schematic sectional view representing the magneto-optical disk 30 used in the MSR method. This conventional magneto-optical disk comprises a dielectric layer 12 and a magnetic triple-layer film including a reproducing layer 13, an intermediate layer 14 and a recording layer 15, and a protective layer 16 formed on a substrate 11 in this order. The intermediate layer 14 controls an exchange-coupled force or a magnetostatic-coupled force between the reproducing layer 13 and the recording layer 15. When the intermediate layer 14 is formed of a magnetic material, the intermediate layer 14 serves as follows: at a temperature below the Curie temperature of the intermediate layer 14, the exchange-coupled force works between the reproducing layer 13 and the recording layer 15, and at a temperature exceeding the Curie temperature, the exchange-coupled force does not work. When the intermediate layer 14 is formed of a non-magnetic material, a magnetostatic-coupled force works between the reproducing layer 13 and the recording layer 15. Table 1 lists general materials, thicknesses and the Curie temperatures of the respective layers, in which those adopted when the intermediate layer 14 is formed of a non-magnetic material are described in brackets.

TABLE 1

| | Material | Thickness (nm) | Curie Temp. (° C.) |
| --- | --- | --- | --- |
| Protection Layer | SiN | 100 | — |
| Recording Layer | $Tb_{21}Fe_{64}Co_{15}$ | 30 | 250 |
| Intermediate Layer | $Tb_{22}Fe_{78}(SiO_2)$ | 15 (2) | 130 (-) |
| Reproducing Layer | $Gd_{24}Fe_{56}Co_{20}$ | 30 | ≈300 |
| Dielectric Layer | SiN | 100 | — |

Now, the principle of the reproducing operation in the MSR method of an exchange-coupled type through the control of the exchange-coupled force by the intermediate layer 14 will be described. FIG. 3 is a schematic diagram showing a state of magnetization in each of the magnetic layers, i.e., the reproducing layer 13, the intermediate layer 14 and the recording layer 15. The magneto-optical disk is rotated in a direction shown with a white arrow, to which is irradiated a reproducing laser beam from the reproducing layer 13 side during the reproducing operation. With the reproducing laser beam, a front portion 17 seen from the rotating direction of the magneto-optical disk in an area hit by the reproducing laser beam is heated to not lower than the Curie temperature of the intermediate layer 14. When a reproducing magnetic field in a direction shown with an arrow 19 is applied from external by the electromagnet 34, the magnetization of the heated portion 17 in the reproducing layer 13 is aligned in one direction, i.e., the direction shown with the arrow 19. Since the front portion 17 of the reproducing layer 13 in which the magnetization is aligned in one direction works as a mask, marks present in this portion are not detected. Therefore, a rear portion 18 which has a lower temperature in the area hit by the reproducing laser beam serves as an aperture, so that marks recorded in the rear portion 18 in the reproducing layer 13 are detected and reproduced. In the aperture, no interface magnetic domain wall is produced between the magnetic layers, and hence the magnetization is kept stable. Since only marks recorded in the aperture (i.e., the rear portion 18) in the area hit by the reproducing laser beam can be detected in this manner, it is possible to read a smaller mark than in the conventional device.

Furthermore, Japanese Patent Application Laid-Open No. 5-89536 (1993) discloses a magneto-optical recording medium having, between a substrate and a recording layer, a reproducing layer made of a material whose phase is changed to be antiferromagnetic with an increase in temperature. This magneto-optical recording medium attains a stable shape of a magnetic domain for the reproducing operation, and is capable of stably MSR reproducing information in a wide range of the operation temperature.

In overwriting recorded data in this magneto-optical recording medium, it is necessary to first erase the existing data by applying an erasing magnetic field by an electromagnet and then to record new data through the conversion of the magnetic field to a recording magnetic field. Therefore, the magneto-optical recording medium disadvantageously requires a longer time to overwrite data. In order to overcome this disadvantage and increase a data transfer speed, various types of direct overwritable magneto-optical recording media utilizing the intensity modulation of a laser beam are proposed.

FIG. 4 is a sectional view showing the structure of a direct overwritable magneto-optical recording medium. This magneto-optical recording medium comprises a (bottom) dielectric layer 22, a memory layer 23 for signal reproduction, an intermediate layer 24 used for controlling an exchange-coupled force between the memory layer 23 and a recording layer 25, the recording layer 25 used for recording or erasing data, a switching layer 26 used for controlling an exchange-coupled force between the recording layer 25 and an initializing layer 27, the initializing layer 27 used for retaining a direction of magnetization in an erasing operation, and a (top) protective layer 28 that are layered on a substrate 21 in this order. Table 2 below lists typical materials, thicknesses, Curie temperatures and film forming conditions for the respective layers in this magneto-optical recording medium. The total thickness of the magnetic film (i.e., the memory layer 23, the intermediate layer 24, the recording layer 25, the switching layer 26 and the initializing layer 27) of the exemplified recording medium is 150 nm.

TABLE 2

| | | | Curie | Forming Condition | |
| | | Thickness | Temp. | Ar Gas Pres- | Power |
| Material | | (nm) | (° C.) | sure(Pa) | (kW) |
| Protective layer | SiN | 100 | — | 0.5 | 1.0 |
| Initializing Layer | $Tb_{30}Co_{70}$ | 40 | >300 | | |
| Switching Layer | $Tb_{20}Fe_{80}$ | 15 | 130 | | |
| Recording Layer | $Tb_5Dy_{25}Fe_{35}Co_{35}$ | 40 | 250 | 0.5 | 1.0 |

TABLE 2-continued

| | | | Curie | Forming Condition | |
| | | Thickness | Temp. | Ar Gas Pres- | Power |
| Material | | (nm) | (° C.) | sure(Pa) | (kW) |
| Intermediate Layer | $Gd_{30}Fe_{50}Co_{20}$ | 15 | ≈300 | | |
| Memory Layer | $Tb_{20}Fe_{71}Co_9$ | 40 | 200 | | |
| Dielectric Layer | SiN | 100 | — | 0.5 | 1.0 |

In recording data, the switching layer 26 hit by the laser beam is heated to not lower than the Curie temperature thereof, and hence, no exchange-coupled force works between the recording layer 25 and the initializing layer 27. Under this condition, a bias magnetic field in a direction reverse to that of an erasing magnetic field is applied, whereby data is recorded in the recording layer 25. When the temperature is decreased to not higher than the Curie temperature of the intermediate layer 24, an exchange-coupled force works between the memory layer 23 and the recording layer 25 thereby to copy the data to the memory layer 23. When the temperature is further decreased and becomes not higher than the Curie temperature of the switching layer 26, an exchange-coupled force works between the recording layer 25 and the initializing layer 27 to align the magnetization in the recording layer 25 with a direction for the erasing operation (i.e., the magnetization direction in the initializing layer 27). Since the recording layer 25 returns to the erasing state after the data recorded therein is transferred to the memory layer 23 via the intermediate layer 24 in this manner, data can be directly overwritten without a need for separate execution of an erasing operation. Therefore, the recording layer 25 is indispensable for the direct overwriting operation.

Thus, in the magneto-optical recording medium having the film structure as shown in Table 2, the intermediate layer 24 and the switching layer 26 function to control an exchange-coupled force between the respective adjacent layers. In this case, it is necessary that the exchange-coupled force to be controlled by the switching layer 26 is larger than the exchange-coupled force to be controlled by the intermediate layer 24 around room temperature. The reason is as follows: it is necessary to copy data in the recording layer 25 to the memory layer 23 at a temperature not lower than the Curie temperature of the switching layer 26 and to forcibly align the magnetization direction in the recording layer 25 with the magnetization direction in the initializing layer 27 when the temperature of the switching layer 26 is decreased to not higher than the Curie temperature so as to retain the erasing state. Therefore, the exchange-coupled force to be controlled by the intermediate layer 24 is required to be sufficiently strong to ensure the copying at a temperature not lower than the Curie temperature of the switching layer 26 and to be sufficiently smaller (for example, half or smaller) than the exchange-coupled force to be controlled by the switching layer 26 at a temperature not higher than the Curie temperature of the switching layer 26.

Now, various types of conventional direct overwriting magneto-optical recording media will be enumerated.

A magneto-optical recording medium disclosed in Japanese Patent Application Laid-Open No. 3-93056 (1991) comprises a magneto-optical recording layer and a perpendicularly magnetized film used for magnetic recording both formed on a substrate. The magneto-optical recording layer includes a copying layer in which a recording signal in the perpendicularly magnetized film is copied and a reproducing layer magnetically bound to the copying layer and used for converting the recording signal into an optical signal by the magneto-optical effect. Data is written in the perpendicularly magnetized film by using a magnetic head, and a signal recorded in the perpendicularly magnetized film is copied, through irradiation of a laser beam, to the copying layer that is bound to the perpendicularly magnetized film by an exchange-coupled or magnetostatic-coupled force. Furthermore, in the reproducing layer magnetically bound to the copying layer, a magnetic domain pattern corresponding to the copying layer is formed. In reproducing data, a magnetization signal recorded in the reproducing layer is converted into an optical signal and read out through the irradiation of a laser beam. Thus, data in this magneto-optical recording medium can be directly overwritten by a magnetic head.

A magneto-optical recording medium disclosed in Japanese Patent Application Laid-Open No. 3-156751 (1991) has a four-layer structure including a recording layer, a recording auxiliary layer, a control layer and an orientation layer. The adjacent magnetic layers are bound to each other through an exchange-coupled force, and the recording layer (a first magnetic layer) has perpendicular magnetic anisotropy. A laser beam which is modulated to have binary intensities is shone to the magneto-optical recording medium. The orientation layer (a fourth magnetic layer) has an exchange-coupled force antagonistic to a magnetostatic-coupled force, and also has a function similar to that of an external magnetic field. Therefore, there is no need to separately apply an external magnetic field.

A magneto-optical recording medium disclosed in Japanese Patent Application Laid-Open No. 3-156752 (1991) has a similar four-layer structure, in which a control layer (a third magnetic layer) has an extremely small thickness and a low Curie temperature. Therefore, the third magnetic layer is greatly influenced by an exchange-coupled force, and an exchange-coupled force from a fourth magnetic layer acts on a second magnetic layer via the third magnetic layer. As a result, a direct overwriting operation can be smoothly conducted with an extremely small initialization magnetic field.

Moreover, Japanese Patent Application Laid-Open No. 3-230339 (1991) discloses a magneto-optical recording medium with an intermediate layer for controlling an exchange-coupled force between a first magnetic layer and a second magnetic layer. In forming the intermediate layer, impurities are mixed therein so as to increase an apparent Kerr rotation angle, thereby decreasing the exchange-coupled force.

A magneto-optical recording medium disclosed in Japanese Patent Application Laid-Open No. 4-192135 (1992) is provided with a layer of rare earth rich sublattice magnetization between a first magnetic layer and a second magnetic layer. Owing to this layer, an exchange-coupled force between the magnetic layers is decreased, and the magnetic layers can be stably formed.

A magneto-optical recording medium disclosed in Japanese Patent Application Laid-Open No. 5-6588 (1993) has a recording layer comprising a memory layer made of a ferromagnetic film having perpendicular magnetic anisotropy and an auxiliary layer formed on the memory layer and made of an antiferromagnetic film which is in the antiferromagnetic phase at room temperature and is changed to be ferromagnetic through magnetic phase transition around the Curie temperature of the memory layer higher than room temperature. The auxiliary layer made of the antiferromagnetic film is used as a layer for assisting a data recording operation.

In the MSR method utilizing an exchange-coupled force, a magnetic layer made of a rare earth-transition metal amorphous alloy film is generally used as the intermediate layer 14. The rare earth-transition metal amorphous alloy film is a ferrimagnetic material and is a kind of ferromagnetic material. Therefore, an interface magnetic domain wall appears between the reproducing layer 13 and the intermediate layer 14 or between the intermediate layer 14 and the recording layer 15. Such a multi-layer medium as above has a hysteresis loop symmetrical with respect to an origin as shown in FIG. 5A. However, the hysteresis loop becomes asymmetric due to the exchange-coupled force, that is, a so-called hysteresis loop shift as shown in FIG. 5B occurs depending upon whether or not the interface magnetic domain wall is formed by the exchange-coupled force between the reproducing layer 13 and the recording layer 15. FIG. 6 shows temperature characteristics of the hysteresis loop shift observed when the intermediate layer 14 is formed of a rare earth-transition metal amorphous alloy. As shown in FIG. 6, an actual value attains a larger magnetic field than a target value in the temperature range from room temperature to a given temperature, and hence, a large reproducing magnetic field is required to reverse the magnetization in the reproducing layer 13 for the formation of a mask. Therefore, it is impossible to achieve an MSR with a reproducing laser beam having a small intensity.

In the MSR method utilizing a magnetostatic-coupled force, the force is too weak to sufficiently copy data from the recording layer 15 to the reproducing layer 13. This method also has a problem that a noise level of a recording signal is increased because of instability, in particular, around a mark.

Also in the direct overwritable magneto-optical recording medium shown in FIG. 4, a material for the intermediate layer 24 is a rare earth-transition metal amorphous alloy. Therefore, the exchange-coupled force between the memory layer 23 and the recording layer 25 may be stronger than required. The exchange-coupled force $\sigma_W$ (which is also denoted as an interface magnetic domain wall energy) is represented by the following equation:

$$\sigma_W = H_S \times (2 M_S d)$$

wherein $H_S$ is a hysteresis loop shift amount; $M_S$ is a saturation magnetization; and d is a thickness of a film. The exchange-coupled force $\sigma_W$ between the memory layer and the recording layer in the film structure listed in Table 2 is 1 to 2 erg/cm$^2$. When the thickness d is increased, the loop shift amount $H_s$ is decreased, but a recording sensitivity is degraded resulting from the increase of the thickness d.

In addition, in the conventional magneto-optical recording medium, when the reproducing power is large (for example, 1.5 mW or more), data in the memory layer 23 sometimes starts to be erased in accordance with the magnetization direction (erasing direction) in the recording layer 25. Such a phenomenon as above takes place when the exchange-coupled force between the memory layer 23 and the recording layer 25 is strong and the loop shift amount of the hysteresis loop is large. Specifically, when the loop shift amount is large, the temperature of the magneto-optical recording medium is increased through the irradiation of the reproducing laser beam thereby to decrease a coercive force. As a result, the exchange-coupled force is increased, and the magnetization is reversed in the absence of the magnetic field to be changed in the magnetization direction of the erasing time. This phenomenon decreases a C/N ratio, thereby degrading a reproducing stability.

SUMMARY OF THE INVENTION

The present invention was devised to overcome the aforementioned problems, and an objective of the invention is to provide a magneto-optical recording medium and a reproducing method for the same in which a recording sensitivity and a reproducing stability are improved and data can be reproduced with low power.

The magneto-optical recording medium of the invention includes an intermediate layer formed of an antiferromagnetic material between a first and a second magnetic layers for controlling the coupling therebetween.

Furthermore, in the reproducing method for the magneto-optical recording medium of the invention, a reproducing laser beam is cast to the first magnetic layer which is perpendicularly magnetized in alignment with a magnetization direction in the second magnetic layer due to the exchange-coupled energy via the intermediate layer, and a reproducing bias magnetic field is applied to the first magnetic layer, thereby aligning the magnetization direction of the first magnetic layer in a portion of an area hit by the reproducing laser beam, and the portion being higher than a predetermined temperature with a direction of the reproducing bias magnetic field to form a mask in the portion. Then, data in the second magnetic layer is copied to the first magnetic layer via the intermediate layer, in another portion of the area hit by the reproducing light beam, where the temperature is lower than the predetermined temperature and no mask is formed.

According to the present invention, it is possible to exert an exchange-coupled force that is smaller than that in a conventional recording medium but larger than a magnetostatic-coupled force between the first and second magnetic layers in the reproducing operation because the intermediate layer is formed of an antiferromagnetic material. FIG. 7A shows a hysteresis loop shift caused when the intermediate layer is formed of a ferrimagnetic material, and FIG. 7B shows a hysteresis loop shift caused when the intermediate layer is formed of an antiferromagnetic material. The loop shift caused when an antiferromagnetic material is used (FIG. 7B) appears under a smaller magnetic field than the loop shift caused when a ferrimagnetic material is used (FIG. 7A). When an antiferromagnetic material is used, the loop shift can be made smaller even at a temperature not higher than the Néel temperature of the antiferromagnetic material, and the magnetization can be reversed to form a mask under application of a smaller reproducing magnetic field than in the case where a ferromagnetic (ferrimagnetic) material is used. In addition, since it is possible to form a mask at a temperature equal to or below the Néel temperature, the reproducing operation with an MSR method can be achieved at a smaller reproducing power than in the case where a ferromagnetic (ferrimagnetic) material is used.

Also, since the exchange-coupled force is smaller than in the conventional recording medium, it is possible to make thinner the other magnetic layers. The thinner magnetic layers can improve a recording sensitivity.

The Néel temperature of the intermediate layer is higher than a temperature at which data is copied. Therefore, it is possible to surely copy the data from the first magnetic layer to the second magnetic layer by the irradiation of the laser beam.

In reproducing data, a mask is formed at a portion of the area hit by the reproducing light beam, where the temperature exceeds a predetermined temperature not higher than the Néel temperature of the intermediate layer. When the magnetization is reversed in the first magnetic layer by a reproducing bias magnetic field, a mask is formed also at a portion where the temperature exceeds the Néel temperature and a portion where the temperature starts to decrease but still exceeds the predetermined temperature. By copying only data in the portion which has a temperature lower than the predetermined temperature and bears no mask to the first magnetic layer, it is possible to reproduce data in the portion smaller than the area hit by the reproducing light beam.

The above and further objects and features of the invention will more fully be apparent from the following detailed description with accompanying drawings.

BRIEF DESCRIPTION OF THE DRAWINGS

FIG. 8 is a schematic sectional view showing the film structure of a magneto-optical recording medium according to Embodiment 1 of the invention;

DESCRIPTION OF THE PREFERRED EMBODIMENTS

Figure 1:
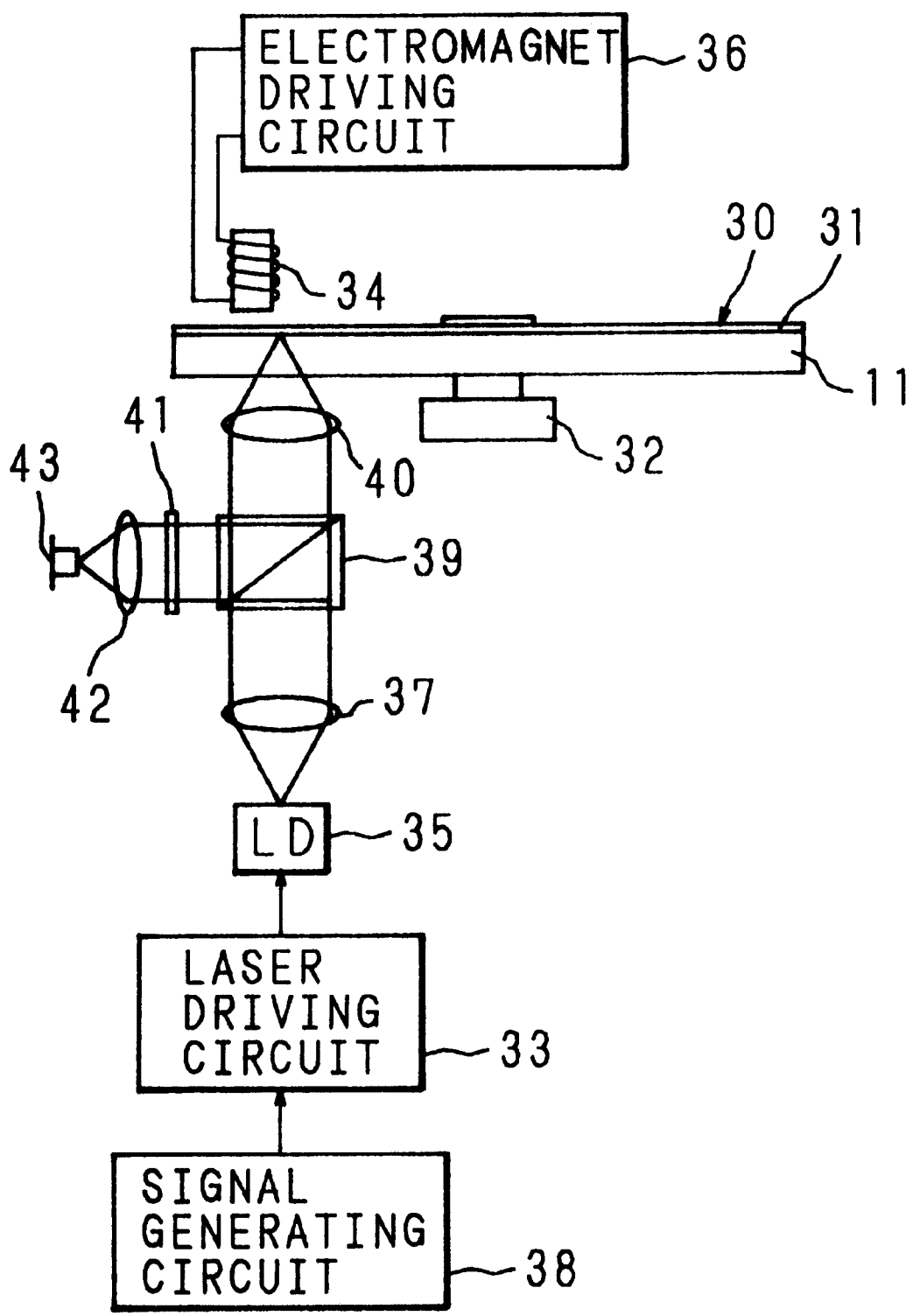
FIG. 1 is a schematic diagram showing the configuration of a general magneto-optical disk device adopting a magnetically induced super resolution (MSR) method.
Figure 2:
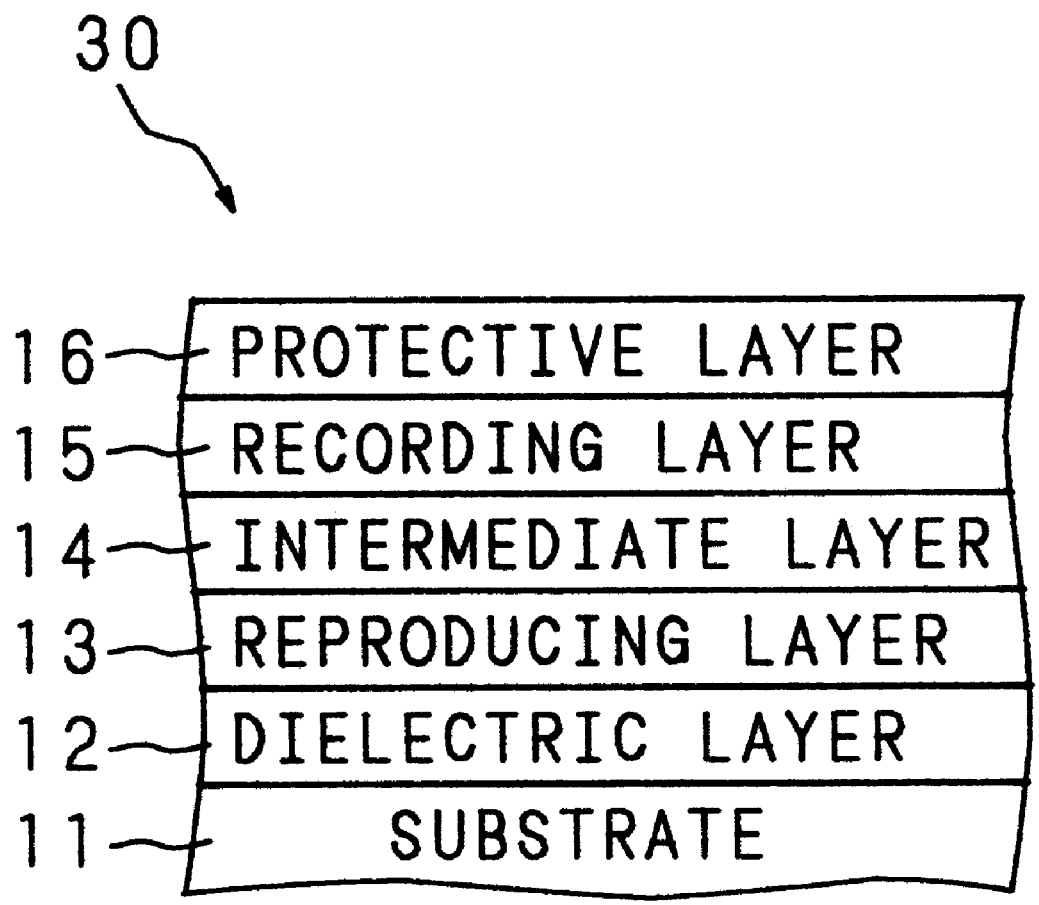
FIG. 2 is a schematic sectional view of a conventional magneto-optical disk.
Figure 3:
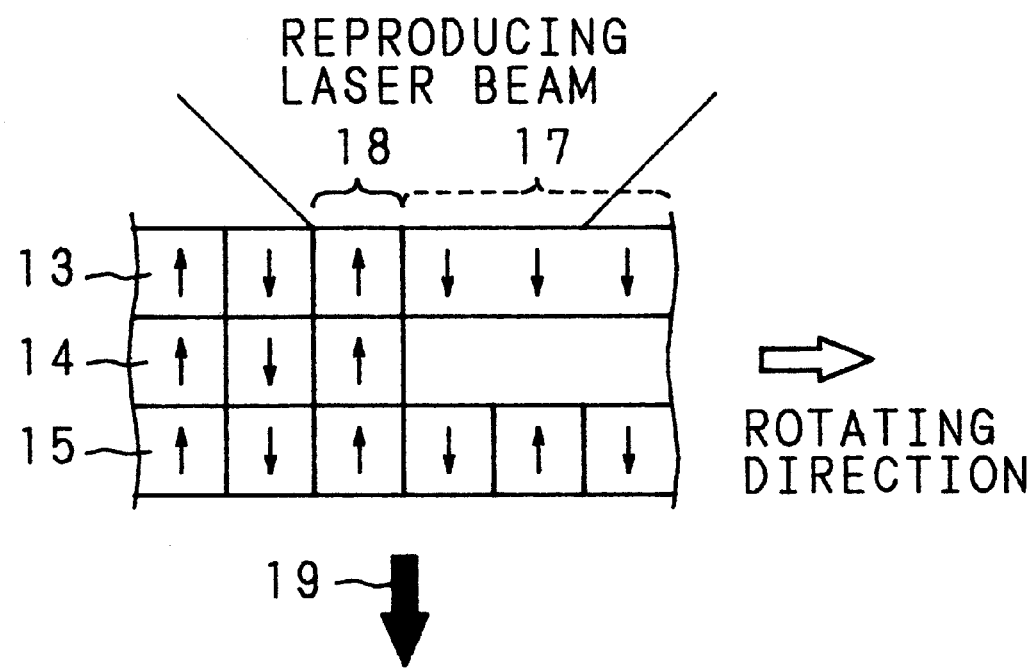
FIG. 3 is a diagram showing a state of magnetization in each magnetic layer in the magneto-optical disk of FIG. 2.
Figure 4:
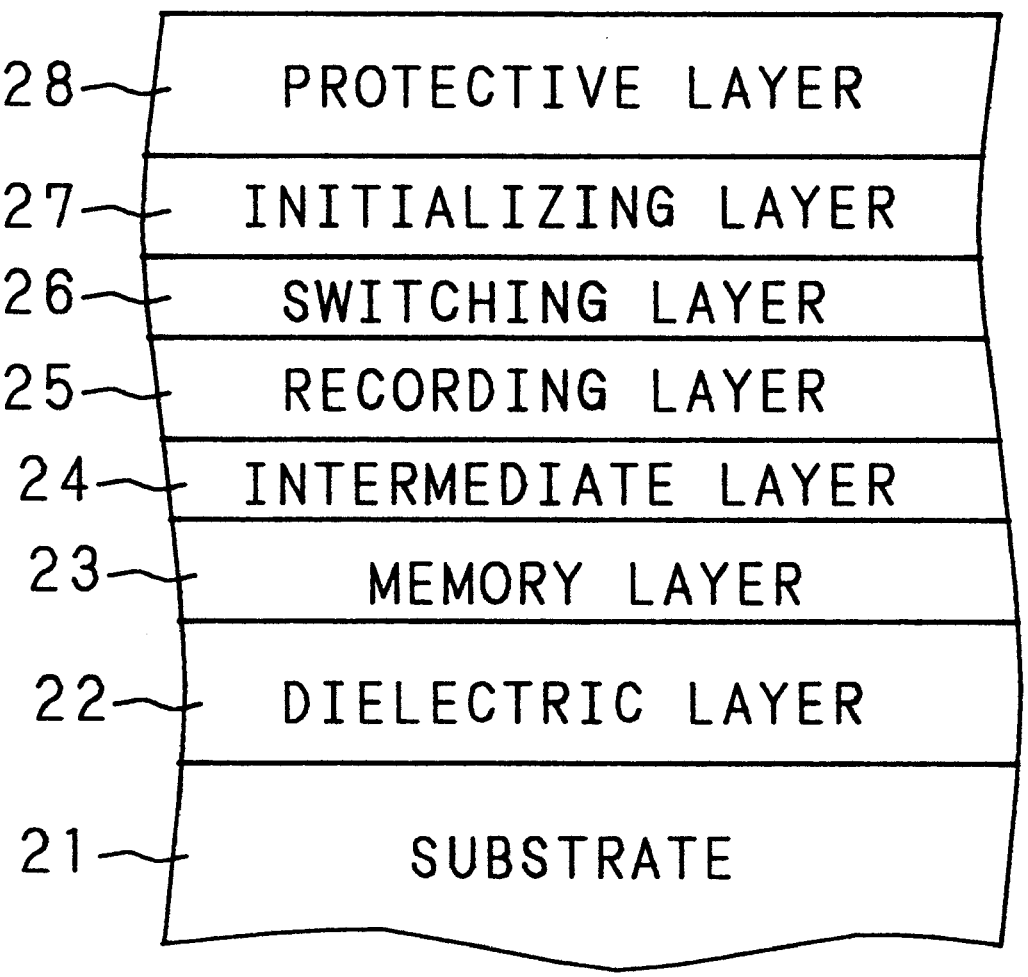
FIG. 4 is a schematic sectional view of a direct overwritable magneto-optical recording medium.
Figure 5A:
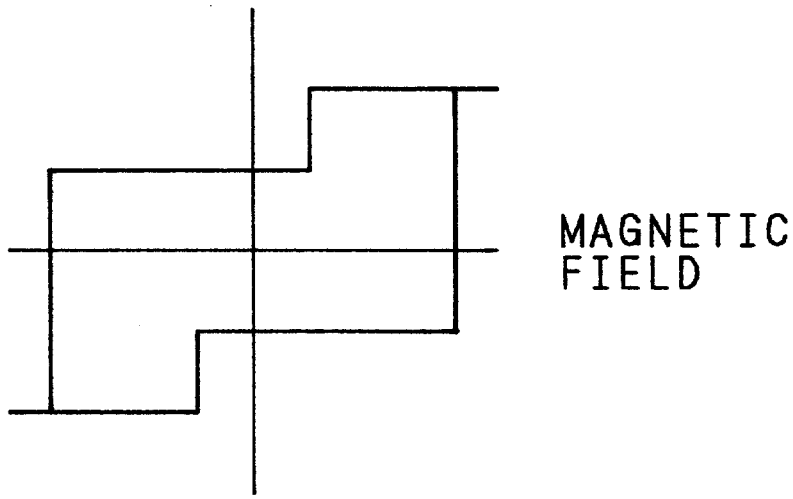
FIG. 5A is a graph showing a hysteresis loop formed by an exchange-coupled force.
Figure 5B:
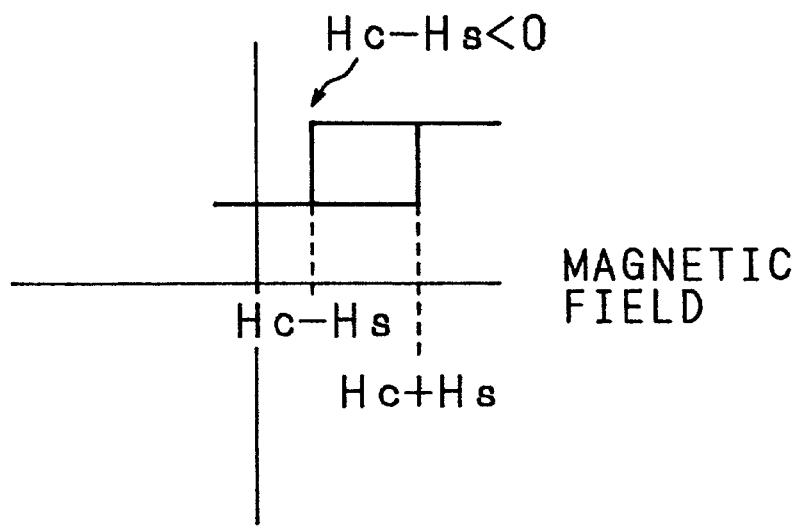
FIG. 5B is a graph showing a shift of the hysteresis loop caused by an exchange-coupled force.
Figure 6:
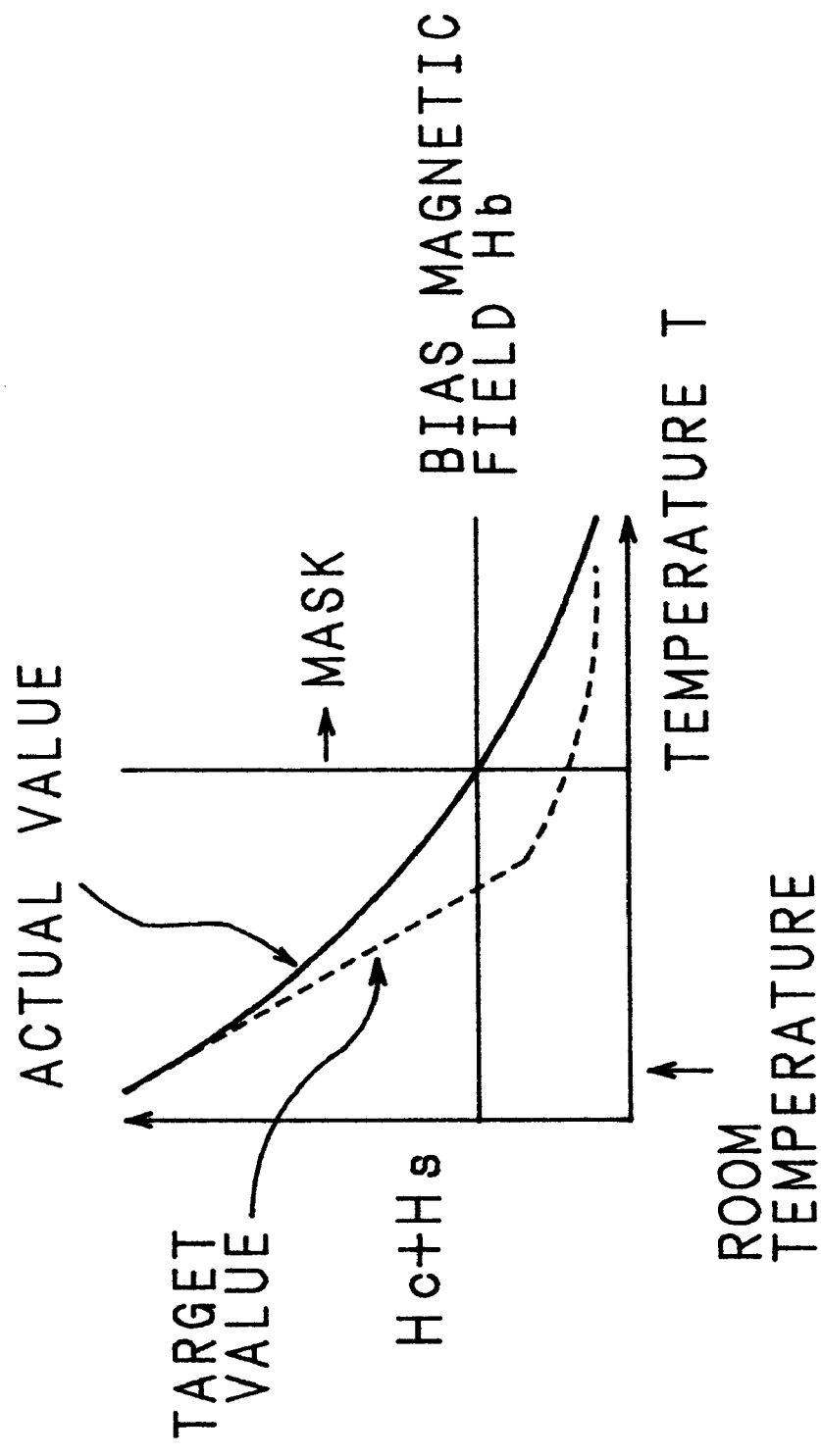
FIG. 6 is a graph showing temperature characteristics of the hysteresis loop shift.
Figure 7A:
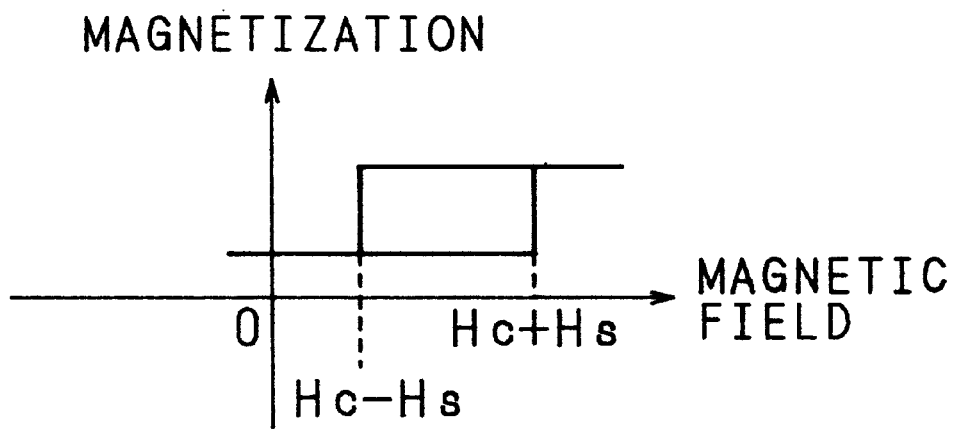
FIG. 7A is a graph showing the hysteresis loop shift caused when an intermediate layer is formed of a ferrimagnetic material.
Figure 7B:
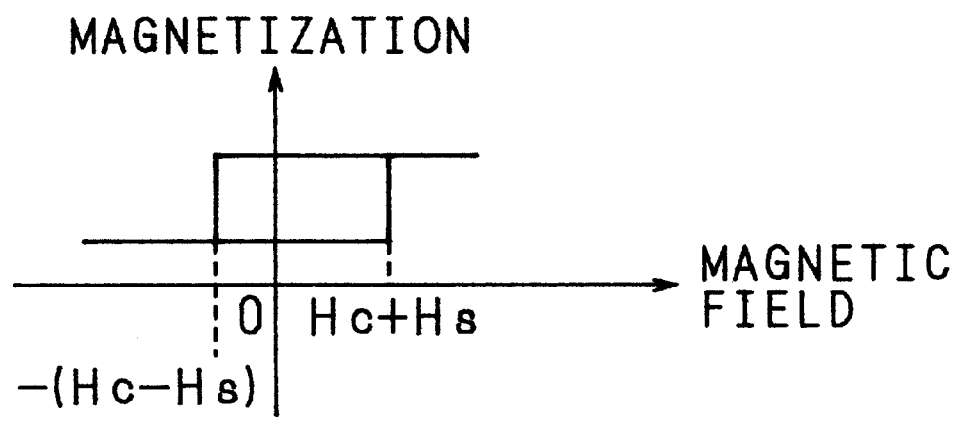
FIG. 7B is a graph showing the hysteresis loop shift caused when an intermediate layer is formed of an antiferromagnetic material.

The present invention will now be described referring to the accompanying drawings.

Embodiment 1

FIG. 8 is a schematic sectional view of a magneto-optical recording medium according to Embodiment 1 of the invention. The magneto-optical recording medium has a substrate 1 which is made of a transparent material such as polycarbonate, amorphous polyolefine, glass, or photopolymer (2P) glass, and guide grooves for tracking and focusing are formed on the substrate 1. On the substrate 1 are formed a dielectric layer 2, three magnetic layers, i.e., a reproducing layer 3, an intermediate layer 4 and a recording layer 5, and a protective layer 6. The reproducing layer 3 and the recording layer 5 are formed of a ferrimagnetic material of a rare earth-transition metal amorphous alloy. The intermediate layer 4 controls an exchange-coupled force between the reproducing layer 3 and the recording layer 5, and can be made of an antiferromagnetic material having a Néel temperature higher than a temperature at which data is copied, the copying temperature ranging from 80° to 120° C.), such as CuO, NiO, CoNiO, CrMn, AuCr, MnFe and the like. When the intermediate layer 4 is formed of CuO, the Néel temperature is approximately 180° C. Table 3 exemplifies materials, thicknesses, Curie temperatures (or Néel temperatures) and forming conditions for the respective layers.

TABLE 3

|  | Material | Thickness (nm) | Curie Temp. (Néel Temp.) (° C.) | Forming Condition Ar Gas Pressure (Pa) | Power (kW) |
|---|---|---|---|---|---|
| Protective layer | SiN | 100 | — | | |
| Recording Layer | Tb$_{21}$Fe$_{64}$Co$_{15}$ | 30 | 240 | | |
| Intermediate Layer | CuO | 20 | (180) | 0.5 | 1.0 |
| Reproducing Layer | Gd$_{24}$Fe$_{56}$Co$_{20}$ | 30 | >300 | | |
| Dielectric Layer | SiN | 100 | — | | |

A reproducing method for this magneto-optical recording medium will now be described. While a reproducing bias magnetic field is applied, a reproducing light beam is cast to the reproducing layer 3 which is perpendicularly magnetized in accordance with a magnetization direction in the recording layer 5 because of the exchange-coupled energy via the intermediate layer 4. As a result, a front portion in an advancing direction of the medium in the irradiation area on the reproducing layer 3 is heated high, so that the magnetization direction therein is aligned with a direction of the reproducing bias magnetic field as described. This heated portion works as a mask. Even when the temperature is not higher than the Néel temperature of the intermediate layer 4, the front portion becomes a mask area as far as the temperature exceeds a predetermined temperature at which the magnetization is reversed in the reproducing layer 3 by the reproducing bias magnetic field. Part of the mask area exceeds the Néel temperature depending upon the irradiation temperature of the reproducing light beam. The temperature of a rear portion in the irradiation area is equal to or lower than the Néel temperature of the intermediate layer 4, and at this low temperature, the magnetization of the reproducing layer 3 is not reversed by the reproducing bias magnetic field. Therefore, the rear portion works as an aperture. Thus, the magnetization direction in the recording layer 5 is copied to the reproducing layer 3 via the intermediate layer 4, so that a signal therein is reproduced. In this manner, data recorded in the portion smaller than the irradiation area of the reproducing light beam can be reproduced.

Figure 9:
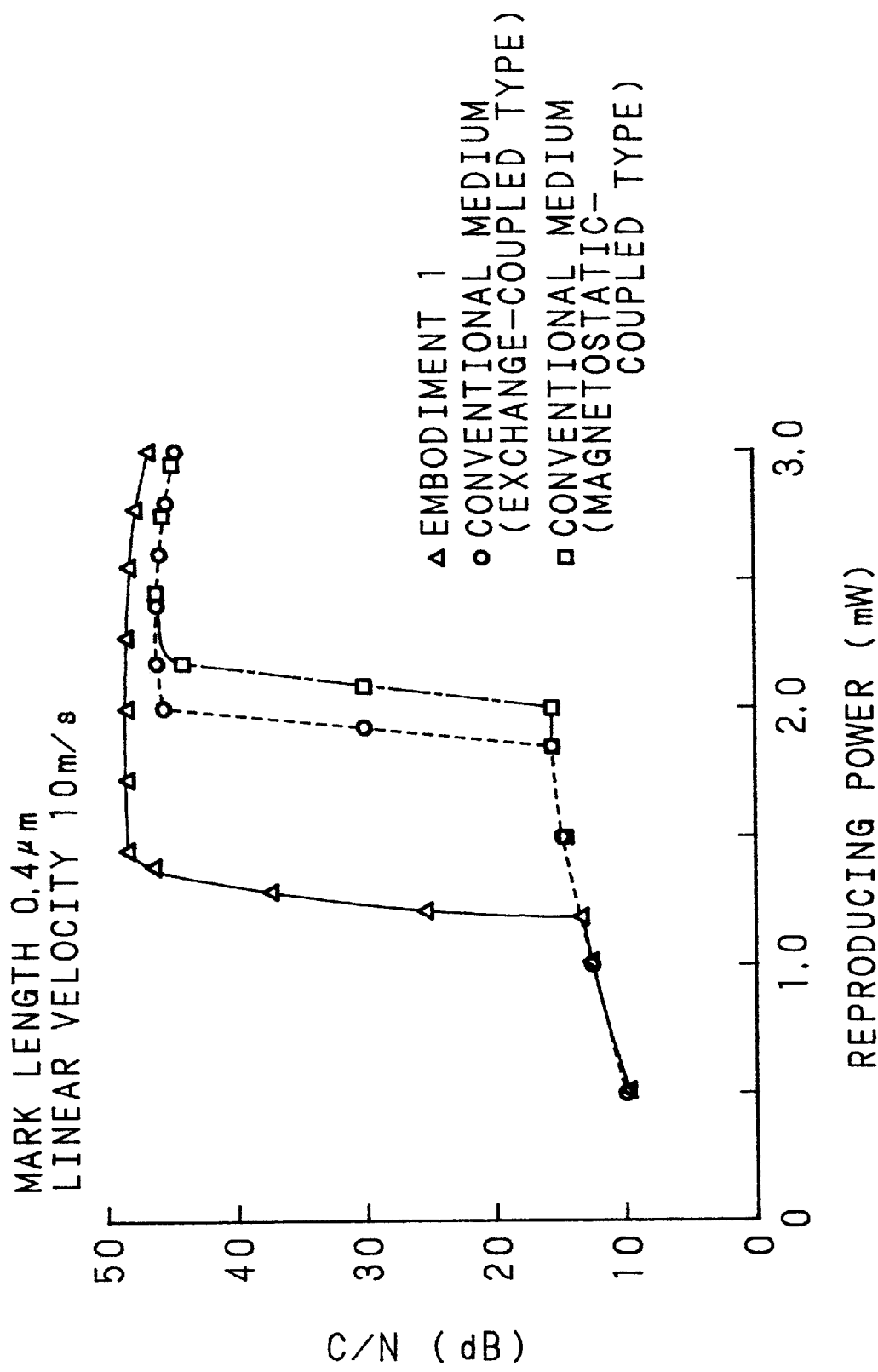
FIG. 9 is a graph showing a C/N ratio in the recording medium of FIG. 8 and in conventional magneto-optical recording media.
Figure 10:
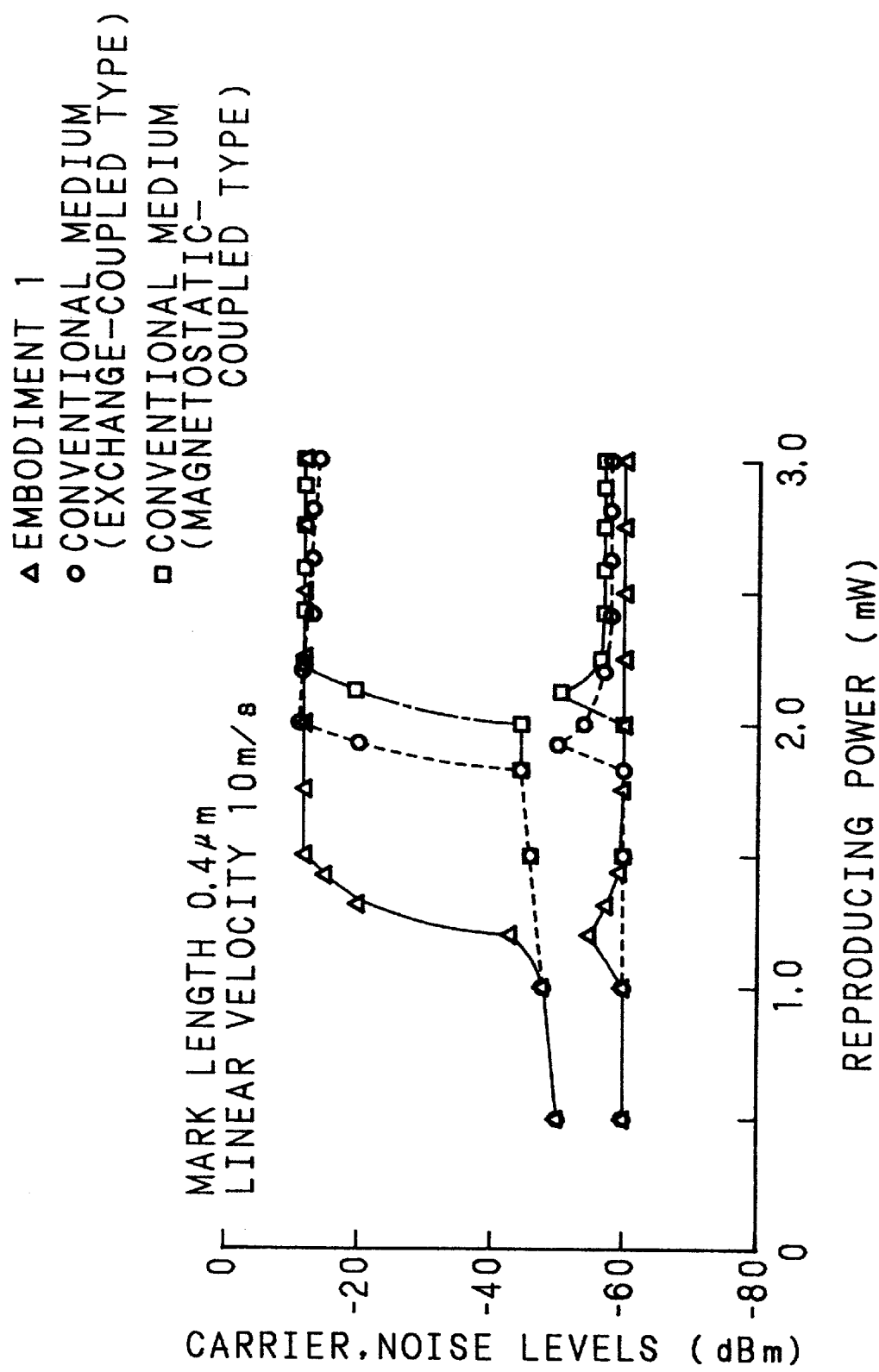
FIG. 10 is a graph showing Carrier, Noise levels in the recording medium of FIG. 8 and in conventional magneto-optical recording media.

FIG. 9 and FIG. 10 are graphs respectively showing a C/N ratio and Carrier, Noise levels in the present magneto-optical recording medium and conventional magneto-optical recording media (one of which is an exchange-coupled type and the other is a magnetostatic-coupled type). The present magneto-optical recording medium can reproduce data with a magnetically induced super resolution with a smaller reproducing power than in the conventional magneto-optical recording medium of the exchange-coupled type. Additionally, a noise level is greatly decreased in the present recording medium as compared with the conventional magneto-optical recording media of the exchange-coupled type and the magnetostatic-coupled type. Thus, the C/N ratio particularly at the reproducing power of 1.8 mW or lower is improved.

Embodiment 2

Figure 11:
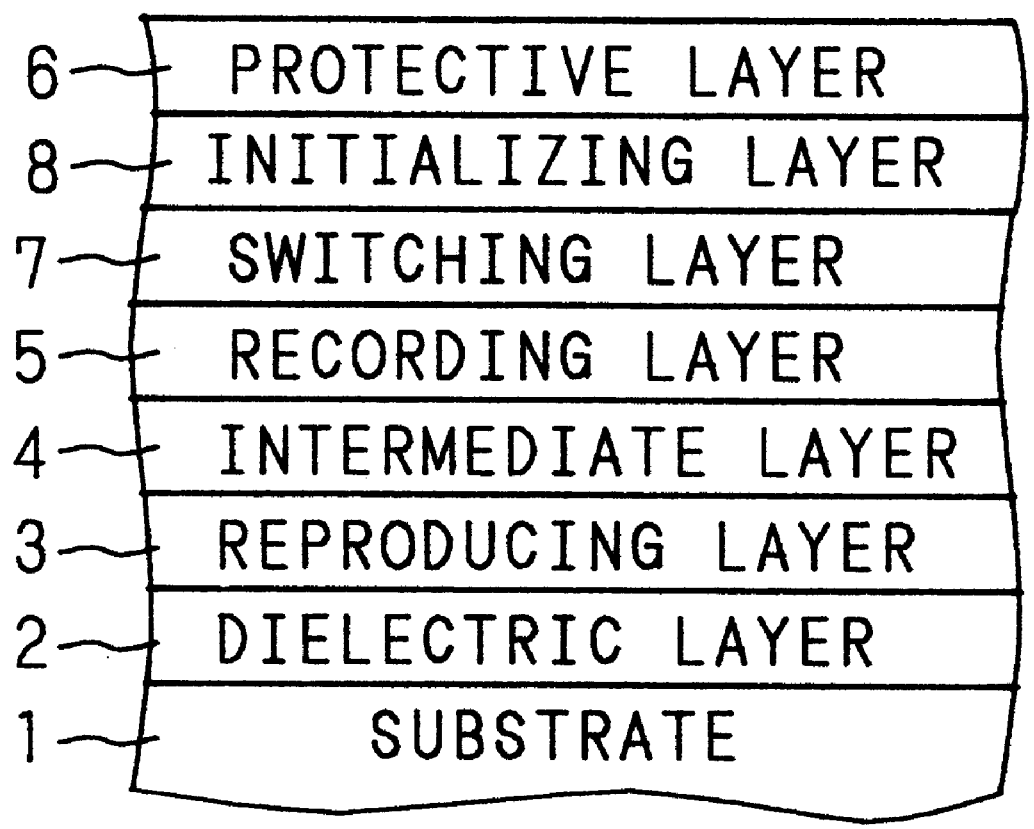
FIG. 11 is a schematic sectional view showing the film structure of a magneto-optical recording medium according to Embodiment 2 of the invention.

FIG. 11 is a schematic sectional view of a magneto-optical recording medium according to Embodiment 2 of the invention. This recording medium is a direct overwritable magneto-optical recording medium comprising a switching layer 7 and an initializing layer 8 held between the recording layer 5 and the protective layer 6 in this order. The rest of the structure is the same as that of Embodiment 1. Table 4 lists examples of materials, thicknesses, Curie temperatures (or Néel temperatures) and film forming conditions for the respective layers.

TABLE 4

|  | Material | Thickness (nm) | Curie Temp. (Néel Temp.) (° C.) | Forming Condition Ar Gas Pressure (Pa) | Power (kW) |
|---|---|---|---|---|---|
| Protective layer | SiN | 100 | — | | |
| Initializing Layer | Tb$_{30}$Co$_{70}$ | 40 | >300 | | |
| Switching Layer | Tb$_{20}$Fe$_{80}$ | 20 | 130 | 0.5 | 1.0 |
| Recording Layer | Tb$_{10}$Dy$_{15}$Fe$_{55}$Co$_{20}$ | 40 | 230 | | |
| Intermediate Layer | NiO | 10 | (220) | | |
| Reproducing Layer | Tb$_{20}$Fe$_{72}$Co$_8$ | 30 | 190 | | |
| Dielectric Layer | SiN | 100 | — | | |

Figure 12:
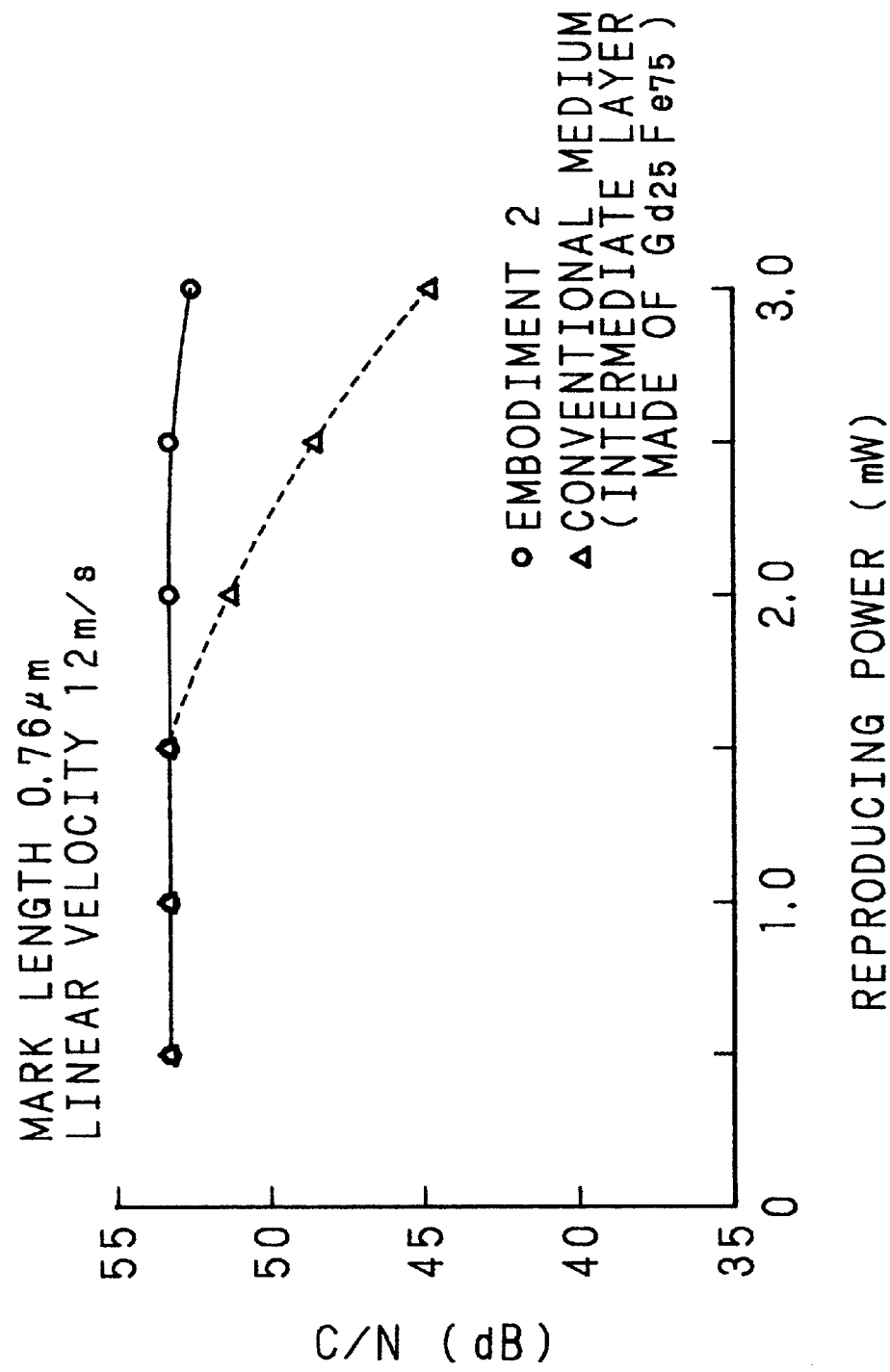
FIG. 12 is a graph showing a C/N ratio in the recording medium of FIG. 11 and in a conventional magneto-optical recording medium.

FIG. 12 is a graph showing a C/N ratio in the present recording medium and a conventional recording medium (which is an exchange-coupled type including an intermediate layer made of Gd$_{25}$Fe$_{75}$). The exchange-coupled force between the reproducing layer 3 and the recording layer 5 of the present recording medium is controlled to be smaller than in the conventional medium using the intermediate layer made of a rare earth-transition metal amorphous alloy. Therefore, even when the reproducing power is large, the C/N ratio is hard to decrease. Thus, the reproducing stability is improved.

Embodiment 3

Figure 13:
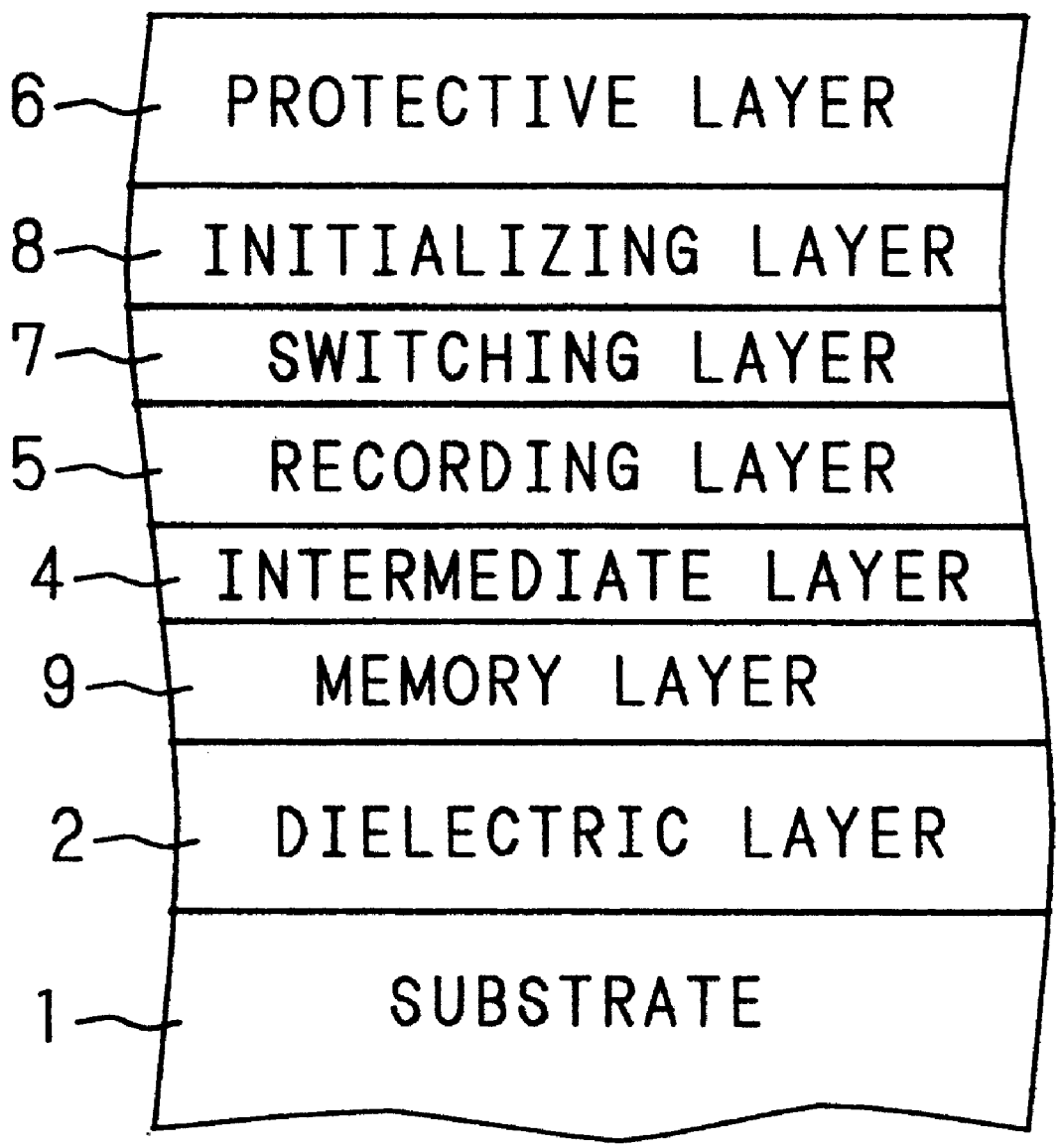
FIG. 13 is a schematic sectional view showing the film structure of a magneto-optical recording medium according to Embodiment 3 of the invention.

FIG. 13 is a schematic sectional view of a magneto-optical recording medium according to Embodiment 3 of the invention. The present recording medium is a direct overwritable magneto-optical recording medium similar to Embodiment 2, but uses thinner magnetic layers than those in Embodiment 2. In this recording medium, a layer used for reproducing data is designated as a memory layer 9. Table 5 lists examples of materials, thicknesses, Curie temperatures (or Néel temperatures) and film forming conditions for the respective layers.

TABLE 5

| | Material | Thickness (nm) | Curie Temp. (Néel Temp.) (° C.) | Forming Condition Ar Gas Pressure (Pa) | Power (kW) |
|---|---|---|---|---|---|
| Protective layer | SiN | 100 | — | | |
| Initializing Layer | $Tb_{30}Co_{70}$ | 25 | >300 | | 1.0 |
| Switching Layer | $Tb_{20}Fe_{80}$ | 10 | 130 | 0.5 | |
| Recording Layer | $Tb_5Dy_{25}Fe_{35}Co_{35}$ | 25 | 250 | | |
| Intermediate Layer | NiO | 5 | (220) | | 0.25 |
| Memory Layer | $Tb_{20}Fe_{71}Co_9$ | 25 | 200 | | |
| Dielectric Layer | SiN | 100 | — | | 1.0 |

Table 6 lists an exchange-coupled energy $\sigma_W$ between the memory layer and the recording layer and a difference $H_C^-(=H_C-H_S)$ in the coercive force of the memory layer at temperatures of 80° C., 100° C. and 120° C. in the present magneto-optical recording medium (with the film structure in Table 5) and in a conventional magneto-optical recording medium (with the film structure in Table 2).

TABLE 6

| | Present recording medium | | Conventional recording medium | |
|---|---|---|---|---|
| Temperature (° C.) | σw (erg/cm²) | ($H_c-H_s$) (kO$_e$) | σw (erg/cm²) | ($H_c-H_s$) (kO$_e$) |
| 80 | 0.2 | 2.0 | 0.6 | 1.8 |
| 100 | 0.15 | 0.9 | 0.45 | 0.8 |
| 120 | 0.1 | −0.2 | 0.3 | −0.3 |

As apparent from Table 6, the exchange-coupled energy $\sigma_W$ in the present recording medium is smaller than that in the conventional medium, and the difference $H_C^-$ in the coercive force of the memory layer of the present recording medium is substantially equal to that of the conventional medium. The total thickness of the magnetic layers of the present recording medium is 90 nm, which is about ⅔ of that of the conventional medium (i.e., 150 nm). Since the exchange-coupled force can be made smaller although the magnetic layers are thinned in the present recording medium, the coercive force of the memory layer 9 can be retained.

Figure 14:
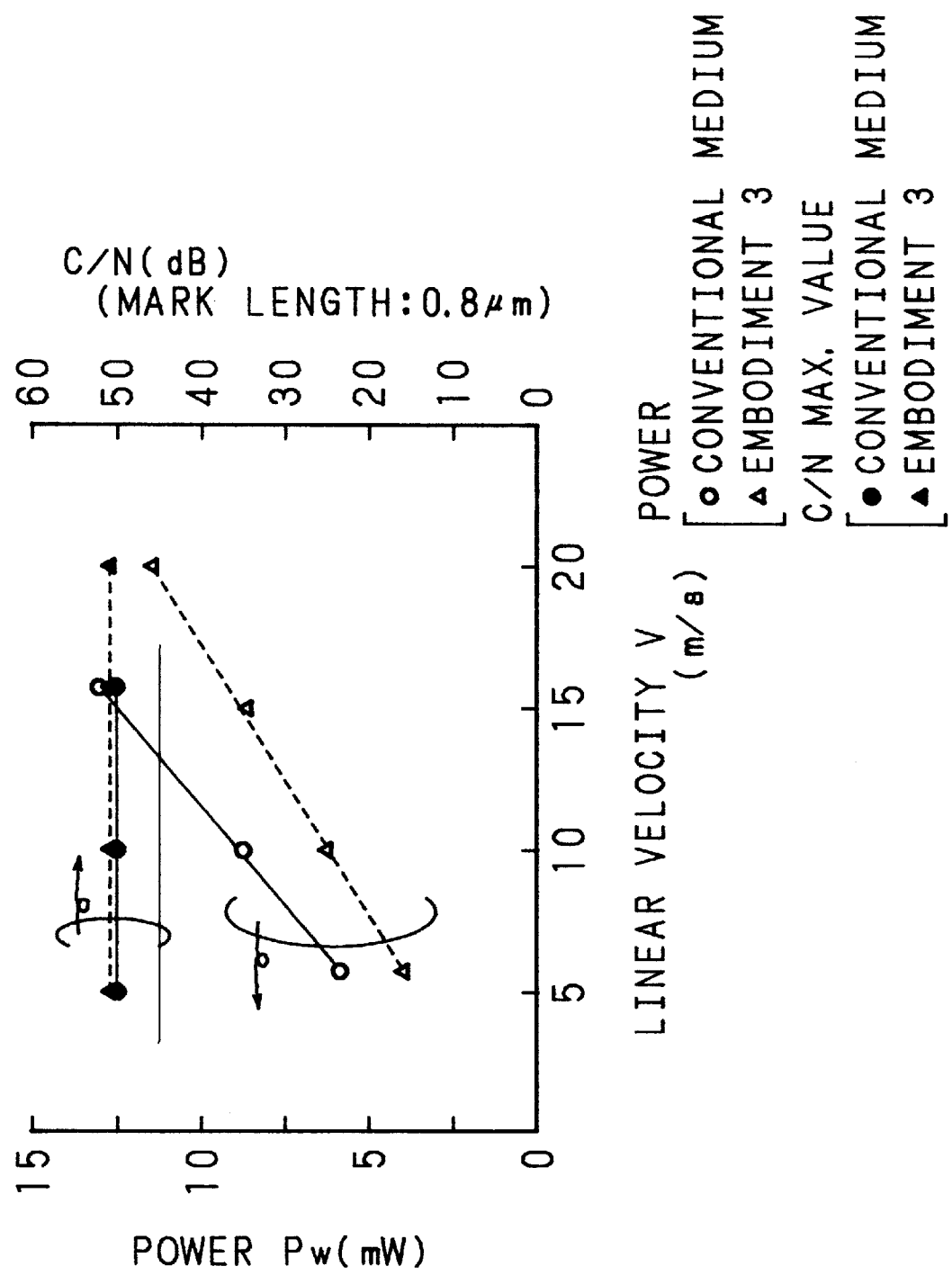
FIG. 14 is a graph showing the relationship among a recording sensitivity, a C/N ratio and a linear velocity in the recording medium of FIG. 13 and in a conventional magneto-optical recording medium.

FIG. 14 is a graph showing the relationship among a recording sensitivity, a C/N ratio and a linear velocity in the present magneto-optical recording medium and a conventional recording medium. The recording sensitivity is indicated as a power in starting to record (write) $P_W$ of high power. As shown in FIG. 14, the power in starting to record (write) $P_W$ of the present recording medium is lowered by approximately 40% at any linear velocity than in the conventional recording medium. This means that the recording sensitivity is improved by approximately 40%. In addition, the C/N ratio in the present recording medium is maintained nearly at the same level as that in the conventional recording medium at any linear velocity.

Figure 15:
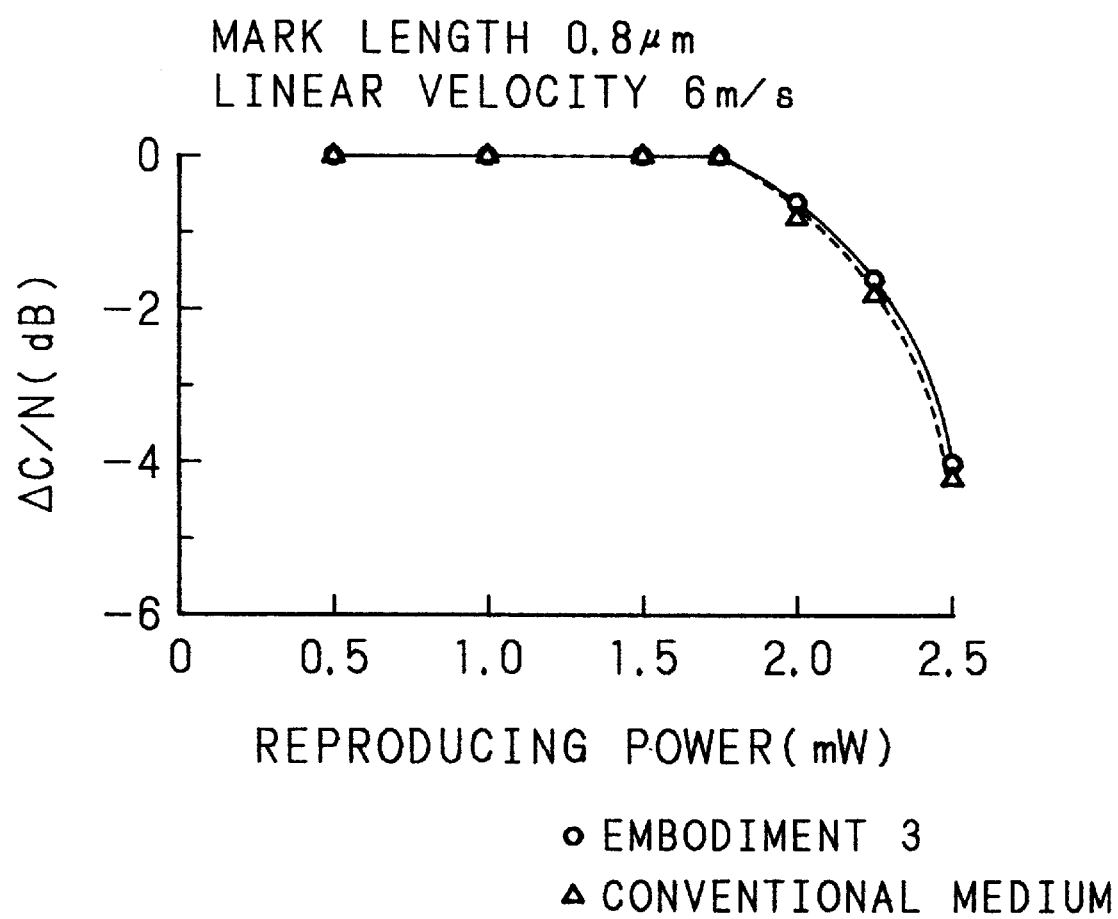
FIG. 15 is a graph showing the relationship between a reproducing power and a decrease in the C/N ratio in the recording medium of FIG. 13 and in a conventional magneto-optical recording medium.

FIG. 15 is a graph showing the relationship between a reproducing power and a decrease in the C/N ratio (i.e., reproducing stability) in the present recording medium and a conventional recording medium. The decrease in the C/N ratio of the present recording medium is approximately of the same degree as that of the conventional recording medium. This is because the difference $H_C^-$ in the coercive force of the memory layer is not varied, and hence, the temperature at which a recording mark in the memory layer starts to be erased is not changed.

In this manner, by forming the intermediate layer 4 of an antiferromagnetic material, the exchange-coupled force between the memory layer 9 and the recording layer 5 can be decreased as compared with that in the conventional recording medium. As a result, the reproducing stability is not degraded even when the thickness of the magnetic layers is reduced. Furthermore, the thinner magnetic layers improve the recording sensitivity.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A magneto-optical recording medium, comprising:

a substrate;

a first magnetic layer and a second magnetic layer formed on said substrate, the first and second magnetic layers being magnetically coupled to each other through an exchange-coupled force whereby the data in the second layer is aligned as a copy of data in the first layer to permit reproduction of data stored in the first layer, the first and second magnetic layers being rare earth-transition metal alloy; and an intermediate layer formed of material which is in an antiferromagnetic state at a reproduction temperature, said intermediate layer being located between the first and second magnetic layers and limiting the exchange-coupled force therebetween so as to obtain an optimum exchanged-coupled force;

wherein said intermediate layer has a Néel temperature higher than said reproduction temperature.

2. A magneto-optical recording medium, comprising:

a substrate;

a first recording magnetic layer for storing data therein in the form of discrete directional magnetizaton, the first magnetic layer being rare earth-transition metal alloy;

a second reproducing magnetic layer for reproducing said data recorded in the first magnetic layer by aligning in accordance with a discrete directional magnetization of said recording layer through an exchange-coupled force induced at a reproduction temperature under the influence of a bias magnetic field, the second magnetic layer being rare earth-transition metal alloy;

a third magnetic layer for controlling recording and erasing of data to and from the first magnetic layer;

a fourth ragnetic layer for holding a magnetization direction of said recording layer during a data erasure operation; and an intermediate layer formed of material which is in a an antiferromagnetic state at said reproduction temperature, said intermediate layer being between the first and second magnetic layers and limiting the exchange-coupled force therebetween, wherein the intermediate layer has a Neel temperature higher than said reproduction temperature.

3. The magneto optical recording medium of claim 1, wherein said rare earth-transition metal alloy is amorphous.

4. The magneto optical recording medium of claim 2 wherein said rare earth-transition metal alloys of said first magnetic layer and said second magnetic layer are amorphous.

5. A magneto-optical disk drive apparatus comprsing:

a magneto optical recording medium, means for recording information on said recording medium, and means for reproducing the recorded information from the recording medium, said recording medium having a substrate, a first magnetic layer and a second magnetic layer formed on said substrate, said first and second magnetic layers being magnetically coupled to each other through an exchange-coupled force whereby data in said second layer is aligned as a copy of data in said fist layer to permit reproduction of data stored in said first layer, said first and second magnetic layers being rare earth-transition metal alloy; and an intermediate layer formed of material which is in an antiferromagnetic state at a reproduction temperature, said intermediate layer being between said first and second magnetic layers and limiting the exchange-coupled force therebetween so as to obtain an optimum exchanged-coupled force;

wherein said intermediate layer has a Neel temperature higher than said reproduction temperature.

6. The optical disk apparatus of claim 5 wherein said rare earth-transition metal alloy is amorphous.

7. A magneto-optical disk drive apparatus comprising:

a magneto optical recording medium, means for recording information on said recording medium, and means for reproducing the recorded information from said recording medium at a reproducing temperature, said recording medium having a substrate;

a first recording magnetic layer for storing data therein in the form of discrete directional magnetization, the first magnetic layer being a rare earth-transition metal alloy;

a second reproducing magnetic layer for reproducing said data recorded in said first magnetic layer by aligning in accordance with a discrete directional magnetization of said recording layer through an exchange-coupled force induced at a reproduction temperature under the influence of a bias magnetic field, said second magnetic layer being a rare earth-transition metal alloy;

a third magnetic layer for controlling recording and erasing of data to and from said first magnetic layer;

a fourth magnetic layer for holding a magnetization direction of said recording layer during a data erasure operation; and an intermediate layer formed of material which is in an antiferromagnetic state at said reproducing temperature, said intermediate layer being between said first and second magnetic layers and limiting the exchange-coupled force therebetween, wherein said intermediate layer has a Neel temperature higher than said reproducing temperature.

8. The optical disk apparatus of claim 7 wherein said rare earth-transition metal alloys of said first magnetic layer and said second magnetic layer are amorphous.

\* \* \* \* \*

UNITED STATES PATENT AND TRADEMARK OFFICE
CERTIFICATE OF CORRECTION

PATENT NO. : 5,965,285
DATED : October 12, 1999
INVENTOR(S) : Mihara et al.

It is certified that error appears in the above-identified patent and that said Letters Patent is hereby corrected as shown below:

In Claim 2, line 15, delete "ragnetic" and insert --magnetic-- therefor

In Claim 2, line 18, delete "in a an" and insert --in an-- therefor

In Claim 5, line 13, delete "fist" and insert --first-- therefor

Signed and Sealed this

Tenth Day of April, 2001

NICHOLAS P. GODICI

*Attest:*

*Attesting Officer*     *Acting Director of the United States Patent and Trademark Office*